(12) United States Patent
Stroppiana

(10) Patent No.: US 7,632,444 B2
(45) Date of Patent: Dec. 15, 2009

(54) YARN FOR PRODUCING SYNTHETIC GRASS, CORRESPONDING METHOD OF PRODUCTION, AND SYNTHETIC GRASS STRUCTURE PRODUCED USING SUCH YARN

(75) Inventor: Fernando Stroppiana, Grinzane Cavour (IT)

(73) Assignee: MONDO S.p.A., Frazione Gallo (Cuneo) (IT)

( * ) Notice: Subject to any disclaimer, the term of this patent is extended or adjusted under 35 U.S.C. 154(b) by 0 days.

(21) Appl. No.: 11/616,979

(22) Filed: Dec. 28, 2006

(65) Prior Publication Data

US 2007/0154661 A1   Jul. 5, 2007

(30) Foreign Application Priority Data

Dec. 30, 2005   (EP)   ................... 05425957

(51) Int. Cl.
- B28B 3/20 (2006.01)
- B29C 47/00 (2006.01)
- B29C 53/00 (2006.01)
- B29C 39/12 (2006.01)
- B29B 9/06 (2006.01)

(52) U.S. Cl. ................. 264/175; 264/74; 264/76; 264/176.1; 264/147; 264/148; 264/141; 264/245

(58) Field of Classification Search ............. 428/17; 28/117; 264/145–148, 151, 141, 152, 127
See application file for complete search history.

(56) References Cited

U.S. PATENT DOCUMENTS

| | | | | |
|---|---|---|---|---|
| 3,761,552 A | * | 9/1973 | Chill et al. | 264/37.28 |
| 4,064,214 A | * | 12/1977 | FitzGerald | 264/147 |
| 4,408,890 A | | 10/1983 | Beckmann et al. | |
| 4,617,208 A | * | 10/1986 | Cadenhead, Sr. | 428/17 |
| 5,217,554 A | * | 6/1993 | Stroppiana | 156/153 |
| 6,793,164 B2 | * | 9/2004 | Stroppiana | 241/24.18 |
| 6,887,535 B2 | * | 5/2005 | Stroppiana | 428/17 |
| 6,951,670 B2 | * | 10/2005 | Stroppiana | 428/17 |
| 2004/0037975 A1 | * | 2/2004 | Stroppiana | 428/15 |
| 2004/0058095 A1 | * | 3/2004 | Carr et al. | 428/17 |
| 2005/0006809 A1 | * | 1/2005 | Stroppiana | 264/141 |

FOREIGN PATENT DOCUMENTS

| | | |
|---|---|---|
| DE | 1939546 | 2/1971 |
| EP | 1158099 A2 | 11/2001 |
| JP | 10204815 | 4/1998 |
| WO | WO/2004/077914 * | 9/2004 |

OTHER PUBLICATIONS

European Search Report, Application No. EP 05 42 5957, dated Jun. 7, 2006.

* cited by examiner

*Primary Examiner*—D. Lawrence Tarazano
*Assistant Examiner*—Nicole T Gugliotta
(74) *Attorney, Agent, or Firm*—Heslin Rothenberg Farley & Mesiti P.C.; Victor A. Cardona, Esq.

(57) ABSTRACT

A yarn to produce, in a synthetic grass, filiform formations reproducing natural grass comprising at least one layer of marbled (Moiriert, marbré) aspect given, for example, by the presence of stripes, streaks, bands or granular patterns each with at least marginally different coloration.

13 Claims, 3 Drawing Sheets

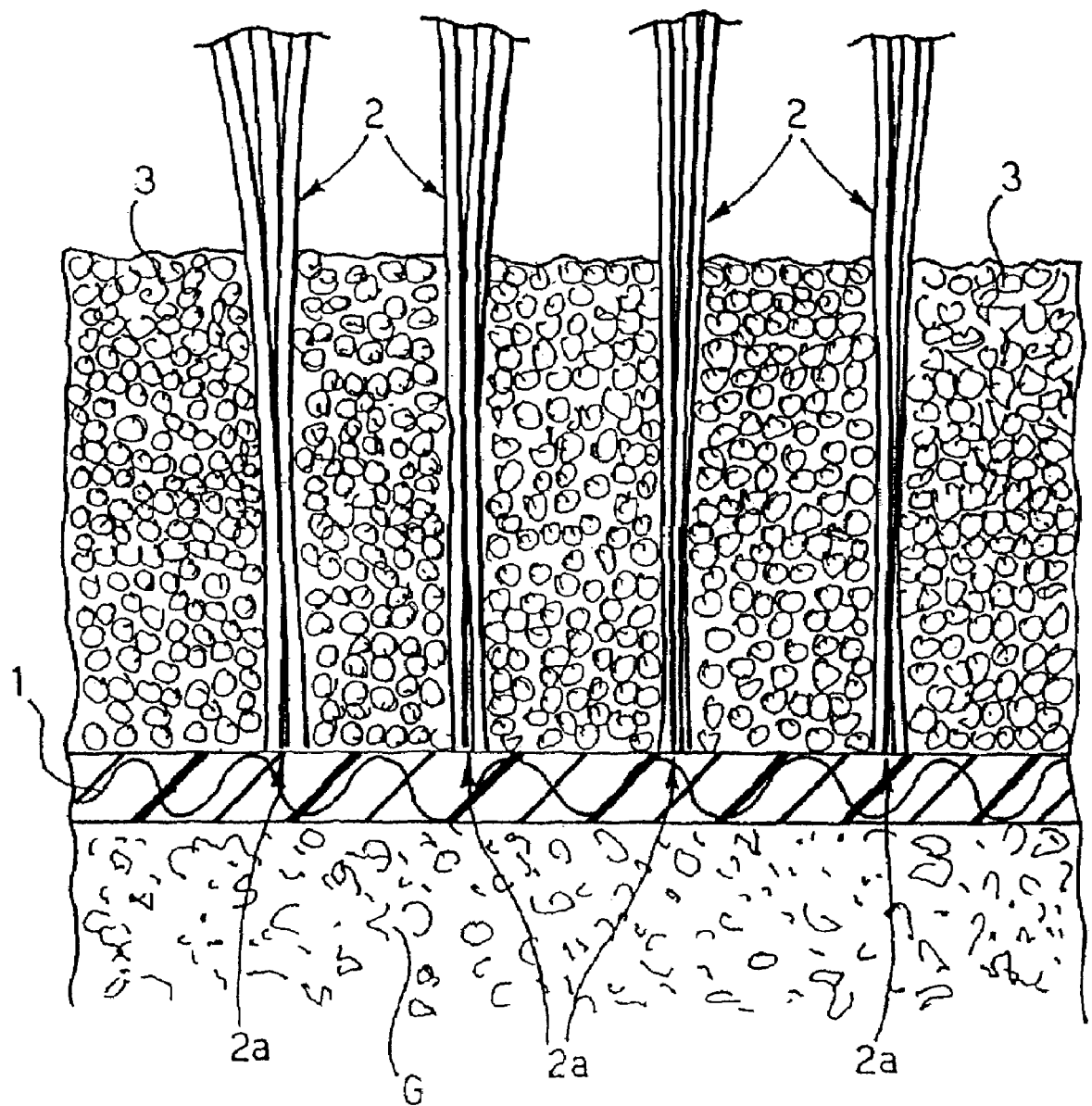

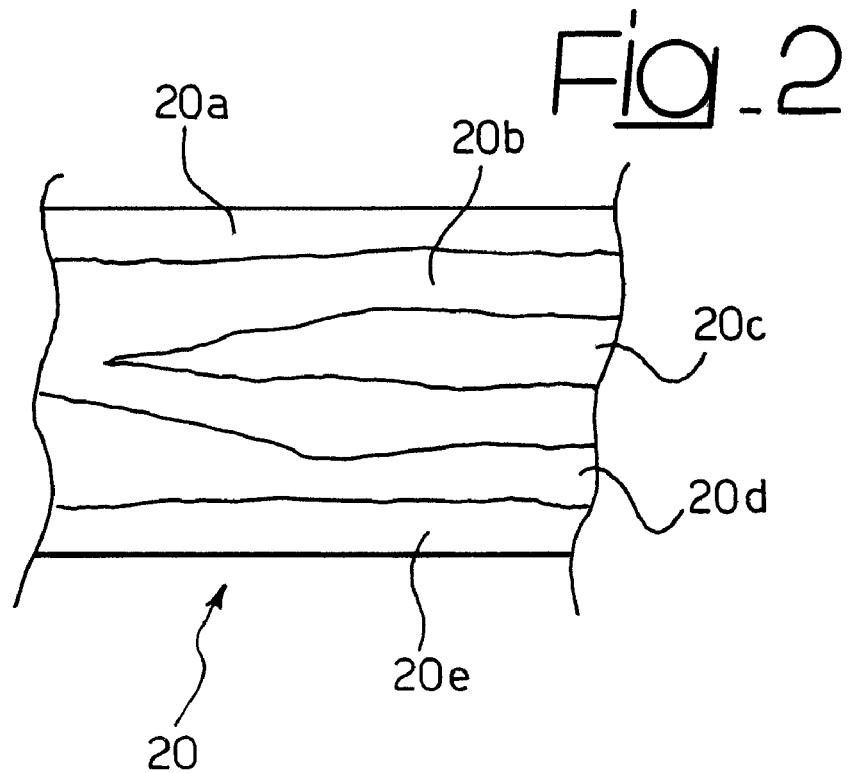
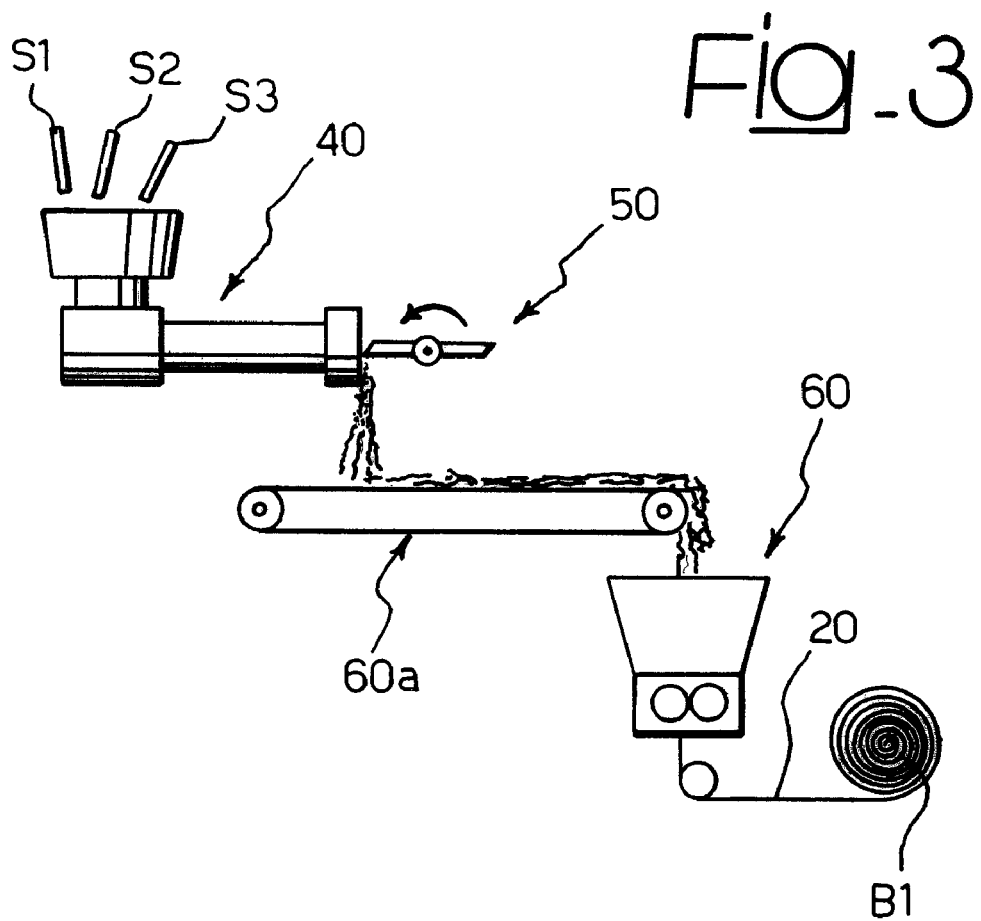

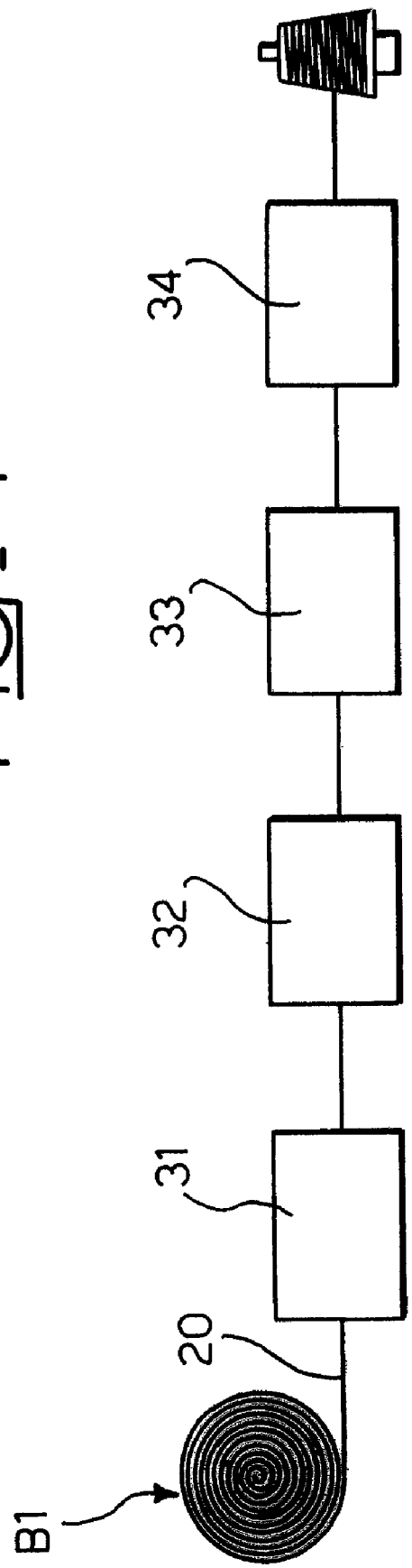

YARN FOR PRODUCING SYNTHETIC GRASS, CORRESPONDING METHOD OF PRODUCTION, AND SYNTHETIC GRASS STRUCTURE PRODUCED USING SUCH YARN

CROSS-REFERENCE TO RELATED APPLICATIONS

This application claims priority from European Patent Application No. 05425957.7, filed on Dec. 30, 2005, the entire disclosure of which is incorporated herein by reference.

This application contains subject matter which is related to the subject matter of co-owned U.S. patent application Ser. No. 11/614,497, filed Dec. 21, 2006, by Fernando Stroppiana, entitled "SYNTHETIC GRASS FLOORING AND METHOD FOR LAYING SAME", which is assigned to the same assignee, Mondo S.p.A., and which is hereby incorporated herein by reference in its entirety.

TECHNICAL FIELD OF THE INVENTION

The present invention relates to synthetic (or "artificial") grass.

BACKGROUND OF THE INVENTION

Synthetic grass turf has long been used, in particular for urban furnishing, as paving for the surrounds of swimming pools and, in general, to replace natural grass in all those conditions in which the laying and maintenance of natural turf may be critical The use of such synthetic grass has recently received new impetus in function of its use as turf for sports applications, for example for football fields. The literature in this connection is very extensive, as may be seen, in regard to patents, from the following documents: U.S. Pat. No. 3,731,923, U.S. Pat. No. 4,337,283, U.S. Pat. No. 5,958,527, U.S. Pat. No. 5,961,389, U.S. Pat. No. 5,976,645, JP-B-32 53 204, JP-A-10037122, DE-A-44 44 030, EP-A-0 377 925 and EP-A-1 158 099.

In particular, from the latter document, which is owned by the present applicant, a synthetic grass structure is known that comprises a substratum in sheet form with a plurality of filiform formations extending from the substratum to simulate grass and a particle-based filling material dispersed among the filiform formations so as to maintain said filiform formations in a substantially erect condition. Specifically, this structure of synthetic grass is characterised in that the particle-based filler material comprises a substantially uniform mass of granular material selected from the group comprising materials based on polyolefines and materials based on vinylic polymers.

Further advantageous developments of this solution have been described in documents EP-A-1 319 753, EP-A-1 375 750, EP-A-1 371 779 and EP-A-1 486 613, all of which are held by the present applicant.

SUMMARY OF THE INVENTION

During recent years, with regard to its application to producing turf for sports fixtures, the chief innovations have concerned the characteristics and the distribution modality of the filler or infill material.

Overall less attention has been paid to the characteristics of the yarn used to make said filiform formations. In this connection, reference may be made for example to the document EP-A-0 259 940, which describes the possibility of using, in synthetic grass, a yarn obtained by co-extrusion of polymer materials of different compositions, in particular with different coefficients of friction.

The solution that still remains prevalent for producing said filiform formations entails the use of a yarn based on plastic material such as polyethylene. The material in question is initially laminated so as to form a sheet of thickness, for example, 200-300 micron. The sheet is then subjected to a cutting operation that subdivides the sheet into a large number of thin strips (for example 10-20 mm wide). The cutting operation is usually followed by one or more longitudinal stretching operations, as well in some cases by fibrillating operations.

The yarn thus obtained is wound onto spools. The spools in question are then used to feed workstations that produce the basic structure of synthetic grass of the type described above, that is with filiform formations that extend from a substratum in sheet form. These workstations typically operate with known techniques that are comparable to tufting or like techniques.

Although overall these traditional techniques are satisfactory, they leave room for further improvements, that can lead in several different directions.

The present invention has as its object that of further perfecting synthetic grass, with the intent of more faithfully reproducing the appearance of natural grass.

According to the present invention, this object is achieved thanks to a yarn having the characteristics that are described specifically in the attached claims, that is thanks to a yarn that presents a marbled (Moiriert, marbré) aspect. The invention also concerns the related production procedure as well as the synthetic grass (with or without filling material) produced using said yarn.

The claims form an integral part of the disclosure of the invention instruction provided herein.

BRIEF DESCRIPTION OF THE DRAWINGS

The invention will now be described, as a example only and without limiting intent, with reference to the attached drawings in which:

FIG. 1 represents in diagram form, in elevation, a synthetic grass turf susceptible of being produced with a yarn of the type described here;

FIG. 2 is a magnified lateral view of one of the the filiform formations within the structure represented in FIG. 1, and FIGS. 3 and 4 illustrate in diagram form the sequence of phases of a procedure to produce the filiform material represented in FIG. 2.

DETAILED DESCRIPTION OF THE DRAWINGS

FIG. 1 reproduces in diagram form an ideal vertical section of the synthetic grass structure comprising a substrate 1 destined to be laid over a ground G comprising, in the most typical conditions of use, a foundation of packed earth on which the synthetic turf is simply laid.

The substrate 1 consists of a sheet or cloth of plastic material, such as, for example, non-woven rubber-coated cloth with, for example, the application of latex such as for example SBR latex.

A plurality of filiform formations extend upwards from the substrate 1, usually disposed in clumps or tufts so as better to simulate blades of grass in natural turf.

In the embodiment illustrated here, which is a simple example, the filiform formations 2 are anchored to the substrate 1 at their proximal extremities, indicated as 2a, and their distal extremities extend upwards for an overall length, measured from the general plane of extension of the substrate 1, typically in the order of 30-65 mm.

The general production criteria of the substrate 1 and the filiform formations 2 (including the procedures to solidly attach the proximal extremity 2a of the filiform formations 2 onto the substrate 1) are known in their techniques, and thus do not require a detailed description here, not least because of themselves they are not relevant to the purpose of understanding the present invention.

Usually when the synthetic turf is laid, a particle-based material 3 is dispersed among the filiform formations 2, above the substrate 1, to act as a filler or infill material. The function of the material 3 is substantially that of maintaining the filiform formations 2 in an erect condition, avoiding their becoming flattened in an undesired fashion onto the substrate 1.

Usually, the particle-based material 3 is dispersed among the filiform formations 2 in sufficient quantities such that the distal stretches of the filiform formations 2 are supported by the infill material 3 for a length that, for example, ranges between 20 and 45-50 mm. This means that the distal extremities of the filiform formations 2 are exposed above the upper surface of the layer of infill material 3 for a length that is in the order of 10-20 mm.

In a particularly advantageous embodiment, the particle-based material 3 is a homogeneous material, dispersed above the substrate 1 and among the filiform formations 2 in a substantially uniform fashion, without giving rise to overlying layers with differentiated characteristics.

Further advantageous characteristics of a synthetic grass of the type described here are apparent in EP-A-1 158 099 and in other documents owned by the present applicant and already quoted in the introductory part of the present description.

It will thus be clear that reference to the synthetic grass structure described above is given as an example only and does not have limiting intent on the scope of this invention.

The solution subject of the present application is indeed capable of being used to produce, using a yarn 20 whose characteristics will be described in greater detail below (possibly in combination with other yarns) a structure of a different type than that represented in FIG. 1.

In particular, the yarn 20 may be used to weave filiform structures for synthetic grass made using techniques that are similar to the techniques used to make carpeting, mats and similar products.

An important characteristic of the yarn 20 described here is given by the fact that it is a yarn with a structure of marbled aspect.

The term "marbled" (Moiriert, marbré) is used very widely in the flooring sector and generally indicates floorings made of cloth, sheets or tiles with an overall aspect of stripes, streaks, bands, or granular patterns that reproduce the appearance of a marble floor.

Thus, in the case of the yarn 20 described here, overall the yarn (or at least one of its layers visible externally, in the case of a yarn with stratified structure) presents an aspect with stripes, streaks, bands or granular patterns (regular or irregular) of colours each at least marginally different.

Such stripes, streaks, bands or granular patterns (for simplicity from here on they will be referred to as stripes, and as the striped appearance of the yarn 20) indicated with references from 20a to 20e, constitute elongated formations that extend in the direction of the length of the yarn 20, and may be present in any number (two or more).

The stripes from 20a to 20e present colours that are each at least marginally different. Usually, just as occurs in the case of flooring, the stripes are in a larger number than the different colours (two or more than two, typically at least three).

In the case of the yarn 20 destined for the production of synthetic grass, the stripes 20a to 20b usually present co-ordinated colours with a basic coloration of green, to which they tend, with their diversity, to give an overall flecked effect.

For example, the stripes may be in different shades of green, yellow, beige, and brown, thus aiming to reproduce the flecks normally present in natural turf, for example the presence of different grass species, the presence of blades of grass containing more or less chlorophyll, and so on.

Typically, the basic material of the yarn 20 is polyethylene, thus a polyolefine that can easily be produced in different chromatic variations with the use of pigments in day-to-day use in the plastics industry.

The diagram in FIGS. 3 and 4 represents, schematically, a procedure that could be used to make yarn such as the yarn 20 represented in FIG. 2.

The procedure in question essentially comprises two principal phases, which may also take place at different times and in different places.

In particular, the sequence of steps represented in FIG. 3 aims to produce a lamina having an overall marbled aspect of the type described above.

In FIG. 3, reference 40 indicates an extruder which is fed with material such as polyethylene in the form of strips S1, S2, S3, . . . , of different colours, corresponding to the colours of the stripes from 20a to 20e which will be present in the yarn 20.

The extruder 40 is usually an extruder of the short screw type and/or one that is controlled in such a fashion that the extruded product does not present uniform coloration.

Downstream of the outlet of the extruder 40 a cutting station 50 operates, for example of the rotating blade type, that reduces the extruded product to the form of beads or chips.

These beads or chips are then fed into a calender 60 that produces a foil 20 with a marbled aspect.

The calender may be fed via a conveyor 60a onto which the beads or chips fall after being formed by the cutting station 50. Alternatively, the chips or beads may fall directly from the cutting station 50 into the gap between the rollers of the calender 60.

The sequence of stages represented in FIG. 3 corresponds substantially to the sequence of steps normally operated to produce floorings of synthetic or rubber material with a marbled appearance. This makes a description in greater detail unnecessary here.

However, it will be appreciated that, whereas in the production of floorings of synthetic or rubber material with marbled appearance, the calender 60 is regulated such as to produce a material in sheets or laminas of a thickness of that least 1 mm (typically in the range 1-2 mm), in the present case the foil 20 usually presents a thickness in the order of 200-300 micron. Again, in the present case the stripes, streaks or bands that give the foil 20 its marbled appearance must be sufficiently thin so that the striped appearance is also noticeable on the individual strips (having a width in the order of 10-20 mm) into which the foil 20 is subdivided in the processing phases described below with reference to FIG. 4.

In the diagram in FIG. 4, reference B indicates a bobbin from which the sheet or foil 20 of polyolefine material of striped ("marbled") aspect produced previously, unrolls in a substantially continuous fashion.

This representation is destined to clarify the fact that the sheet or foil 20 of polyolefine material of striped aspect produced in the calender 60 can be wound onto a bobbin for storage and/or transport in view of its use at different times and in different places from its place of production. However, the sheet or lamina 20 produced in the calender 60 may be sent directly to the other manufacturing phases described below as part of a single production process taking place on line, that is in an integrated fashion.

In FIG. 4, reference 31 indicates a workstation in which the foil 20 is subjected to a longitudinal cutting action that, starting from the bonded sheet, produces a large number of strips of reduced transversal width (10-20 mm) each of which presents a marbled aspect of the type represented in FIG. 2 and is susceptible of producing a single yarn of synthetic grass.

In the series of workstations indicated as 32 and 33, the said strips are subjected to a series of operations of longitudinal stretching, fibrillating and stabilising, carried out according to known criteria in order to give the yarn an undulating appearance or to texturise it, destined to produce a more faithful reproduction of the appearance of natural grass.

Lastly, in the station indicated as 34, the yarns thus produced are wound onto spools S. The spools S are subsequently destined (including at different times and in different places) to feed the workstations that make the synthetic grass.

As has already been said, the operations schematically represented by blocks 31 to 34 are susceptible of being performed using processes and equipment of conventional technique; this makes it superfluous to provide a detailed description of such processes and equipment here. In particular, the order in which the operations of cutting, stretching, fibrillating (optional) and stabilising are performed may be changed with respect to what is described above, for example stretching may precede cutting.

Experiments conducted to date by the applicant show that the fact of using a yarn 20 of marbled appearance, with strips from 20a to 20e of coloration in the range of greens and the relative flecked aspect as described above enables synthetic grass to be produced in which the filiform formations reproduce the aspect of natural grass in a very faithful manner.

Naturally, while the principles of the invention remain established, the details of production and/or the embodiments may vary widely with regard to that described and illustrated, as an example only and without limiting intent, without thereby departing from the sphere of the invention, as it is defined in the following claims. In particular, in the embodiment illustrated here, the marbled aspect of the yarn is given to it providing for the presence of at least one layer with a marbled aspect given by the presence of longitudinal stripes, streaks, bands or granular patterns (20a to 20e) each with at least marginally different coloration (pigmentation). In a variant that is less preferred at present, the marbled aspect of the yarn 20 might be given to it using a stratified structure comprising at least two neighbouring and exposed layers, said at least two layers being comprised, respectively, of different materials susceptible to be pigmented either in the same fashion (for example with the same background green colour) or with different pigmentation within the terms outlined above. Said materials may, for example, be a basic polyolefine material and a thermoplastic elastomeric material (TPE).

The invention claimed is:

1. A method for use in producing a yarn presenting a marbled aspect, the method comprising:
    feeding an extruder with strips of different colors to produce an extruded product having a non-uniform coloration;
    cutting the extruded product to reduce the extruded product in the form of beads or chips, each of the beads or chips comprising a plurality of the different colors;
    feeding the beads or chips to a calendar to produce a foil having a marbled aspect;
    subjecting the foil with marbled aspect to substantially longitudinal cutting so as to subdivide the foil into strips of different colors, each of the strips usable to produce a yarn of marbled aspect; and
    whereby the yarn is configured to produce, in a synthetic grass, filiform formations reproducing natural grass.

2. The method according to claim 1, wherein the foil presents a basic green coloration.

3. The method according to claim 1, wherein the material is a polyolefine-based material.

4. The method according to claim 1, wherein said polyolefine-based material is selected from within the group comprised of polyethylene, polypropylene and/or mixtures and/or co-polymers of these.

5. The method according to claim 1, wherein said polyolefine-based material is polyethylene.

6. The method according to claim 1, further comprising subjecting said foil of marbled aspect to longitudinal stretching before or after said cutting operation.

7. The method according to claim 1, further comprising subjecting said strips obtained through said cutting operation starting from said foil of marbled aspect to fibrillation.

8. The method according to claim 1 further comprising winding said yarn on spools.

9. The method according to claim 1, wherein said portions present at least three different colours.

10. The method according to claim 1 wherein said marbled aspect is given by the presence, in said yarn, of portions each with at least marginally different coloration.

11. The method according to claim 1 wherein said portions are of greater number than their different colours.

12. The method of claim 1 wherein the strips of foil are sufficiently thin so that a striped appearance is evident on each of the strips and each of the strips is sufficiently thin so as to be utilized to produce a single yarn of synthetic grass.

13. A method for producing a yarn presenting a marbled aspect, the method comprising:
    feeding an extruder with strips of different colors to produce an extruded product having a non-uniform coloration;
    cutting the extruded product to reduce the extruded product in the form of beads or chips, each of the beads or chips comprising a plurality of the different colors;
    feeding the beads or chips to a calender to produce a foil having a marbled aspect;
    subjecting the foil with marbled aspect to substantially longitudinal cutting so as to subdivide the foil into strips of different colors; and
    at least one of providing each of the strips with an undulating appearance and texturizing each of the strips to produce a yarn of marbled aspect, the yarn configured to produce filiform formations reproducing natural grass.

* * * * *